US008656215B2

(12) United States Patent
Akirav et al.

(10) Patent No.: US 8,656,215 B2
(45) Date of Patent: *Feb. 18, 2014

(54) DISASTER RECOVERY PRODUCTION TAKEOVER

(71) Applicant: International Business Machines Corporation, Armonk, NY (US)

(72) Inventors: Shay H. Akirav, Petach-Tikva (IL); Yariv Bachar, Ma'abarot (IL); Aviv Caro, Modiin (IL); Dov N. Hepner, Hertzelyia (IL); Ofer Leneman, Kfar Saba (IL); Gil E. Paz, Yehud (IL); Tzafrir Z. Taub, Givaataim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,842

(22) Filed: Feb. 12, 2013

(65) Prior Publication Data

US 2013/0166946 A1 Jun. 27, 2013

Related U.S. Application Data

(63) Continuation of application No. 12/902,093, filed on Oct. 11, 2010, now Pat. No. 8,392,754.

(51) Int. Cl.
*G06F 11/00* (2006.01)
*G06F 11/20* (2006.01)

(52) U.S. Cl.
USPC ............................ 714/6.3; 714/6.31; 707/655

(58) Field of Classification Search
USPC .......... 714/6.3, 6.31, 6.32; 707/640, 655, 694
See application file for complete search history.

(56) References Cited

U.S. PATENT DOCUMENTS

| 5,555,404 A | 9/1996 | Torbjornsen et al. |
| 5,778,395 A | 7/1998 | Whiting et al. |
| 5,970,030 A | 10/1999 | Dimitri et al. |
| 6,317,814 B1 | 11/2001 | Blendermann et al. |
| 6,357,030 B1 | 3/2002 | Demura et al. |
| 6,557,073 B1 * | 4/2003 | Fujiwara et al. ............... 711/111 |

(Continued)

FOREIGN PATENT DOCUMENTS

| CN | 101449464 A | 6/2009 |
| EP | 0661702 A2 | 12/1994 |

(Continued)

OTHER PUBLICATIONS

"Virtual Tape Library—VTL User Guide," Sun Microsystems, Inc., Part No. 96267, Aug. 2007, Revision C, EC131408, 292 pages.

(Continued)

*Primary Examiner* — Joseph Schell
(74) *Attorney, Agent, or Firm* — Griffiths & Seaton PLLC

(57) ABSTRACT

Various embodiments for disaster recovery (DR) production takeover in a computing environment by a processor device are provided. If, for a designated storage system operable in the computing environment, a takeover operation may be executed, and a DR storage system has validly replaced the designated storage system using a replacement process, a withdrawal of a DR mode of operation is performed, and ownership of at least one storage device operable in the computing environment is transferred to the DR storage system. The replacement process authorizes the DR storage system to transfer the ownership while withdrawn from the DR mode of operation.

17 Claims, 8 Drawing Sheets

(56) References Cited

U.S. PATENT DOCUMENTS

| | | | |
|---|---|---|---|
| 7,117,213 | B2 | 10/2006 | McDermott et al. |
| 7,302,540 | B1 | 11/2007 | Holdman et al. |
| 7,610,506 | B2 | 10/2009 | Arai |
| 7,669,023 | B2 | 2/2010 | Murase |
| 7,885,928 | B2 | 2/2011 | Harrington et al. |
| 8,037,349 | B2 | 10/2011 | Mandagere et al. |
| 8,060,779 | B2 | 11/2011 | Beardsley et al. |
| 2005/0114598 | A1 | 5/2005 | Hartung et al. |
| 2006/0123189 | A1* | 6/2006 | Bitner et al. ........ 711/111 |
| 2007/0268834 | A1 | 11/2007 | Buckley et al. |
| 2008/0010496 | A1 | 1/2008 | Das et al. |
| 2008/0086610 | A1 | 4/2008 | Ejiri |
| 2008/0172572 | A1* | 7/2008 | Beardsley et al. ........ 714/6 |
| 2009/0271454 | A1 | 10/2009 | Anglin et al. |
| 2009/0300409 | A1 | 12/2009 | Bates et al. |
| 2010/0031080 | A1 | 2/2010 | Shangguan |
| 2010/0037031 | A1 | 2/2010 | Desantis et al. |
| 2010/0180075 | A1 | 7/2010 | McCloskey et al. |

FOREIGN PATENT DOCUMENTS

| | | |
|---|---|---|
| JP | 2000181807 A | 6/2000 |
| KR | 20090019784 A | 2/2009 |
| WO | 2007136913 A2 | 11/2007 |

OTHER PUBLICATIONS

Rabin, "Fingerprinting by random polynomials", Technical Report TR-15-81, [online], Harvard University, Department of Computer Science, 1981, [retrieved on Apr. 15, 2013], Retrieved from the Internet: <URL:http://www.xmailserver.org/rabin.pdf>.

* cited by examiner

DISASTER RECOVERY PRODUCTION TAKEOVER

REFERENCE TO RELATED APPLICATION

This Application is a continuation of U.S. patent application Ser. No. 12/902,093, now U.S. Pat. No. 8,392,754, filed on Oct. 11, 2010, the contents of which are incorporated herein by reference.

BACKGROUND OF THE INVENTION

1. Field of the Invention

The present invention relates in general to computers, and more particularly to apparatus, method and computer program product embodiments for disaster recovery (DR) production takeover in deduplication systems in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

Computing environments better known as deduplication systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. Such fault tolerance and wide availability is increasingly demanded. For example, replication may be used in certain disaster recovery (DR) scenarios to retain data security and data access. While several existing approaches may be used to perform data replication, and specifically, replication of deduplicated data entities, these approaches have accompanying limitations that negatively affect replication efficiency, system performance and data consistency, require additional overhead, or a combination of the above.

SUMMARY OF THE INVENTION

In situations where a prolonged failure of a primary computing storage environment (such as a virtual tape storage facility) occurs, a disaster recovery (DR) plan is typically executed to ensure data integrity at the remote/secondary site with minimal recovery point objective (RPO). However, once the primary system is revived, data from the primary system could not be replicated freely to the secondary system until a synchronization operation occurs that reconciles the changes that occurred while the primary storage environment was inoperable or otherwise not fully functional. Moreover, a DR test mode is unable to allow replication of primary site changes to the secondary while testing DR plan execution at the secondary site.

In one exemplary situation, the temporary production site may create new data storage devices (e.g., cartridges) and/or write on preexisting devices while still operational as a target for multiple other source systems. In order to return production to the original site (because the primary system has been revived or recreated from scratch) a synchronization operation between the DR and primary site is needed while receiving replication from other source systems concurrently. Additionally, the ability to continue production after transfer to the permanent site from the DR site requires "ownership synchronization" over each device (again, e.g., cartridge), which necessitates a granularity of a single device.

The issues described above are generally not addressed by conventional replication systems. As a result, use of these conventional solutions may result in shutdown of the DR system for a number of source systems that may be in the midst of replication processes. In addition, potential loss of data may occur given that the remote site may have experienced changes that would be overwritten by the primary site when running system recovery operations if synchronization will not take place. Accordingly, a need exists for a mechanism in a data replication environment for addressing the issues previously described.

In view of the foregoing, various embodiments for disaster recovery (DR) production takeover in a computing environment are provided. In one embodiment, by way of example only, if, for a designated storage system operable in the computing environment, a takeover operation may be executed, and a DR storage system has validly replaced the designated storage system using a replacement process, a withdrawal of a DR mode of operation is performed, and ownership of at least one storage device operable in the computing environment is transferred to the DR storage system. The replacement process authorizes the DR storage system to transfer the ownership while withdrawn from the DR mode of operation.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
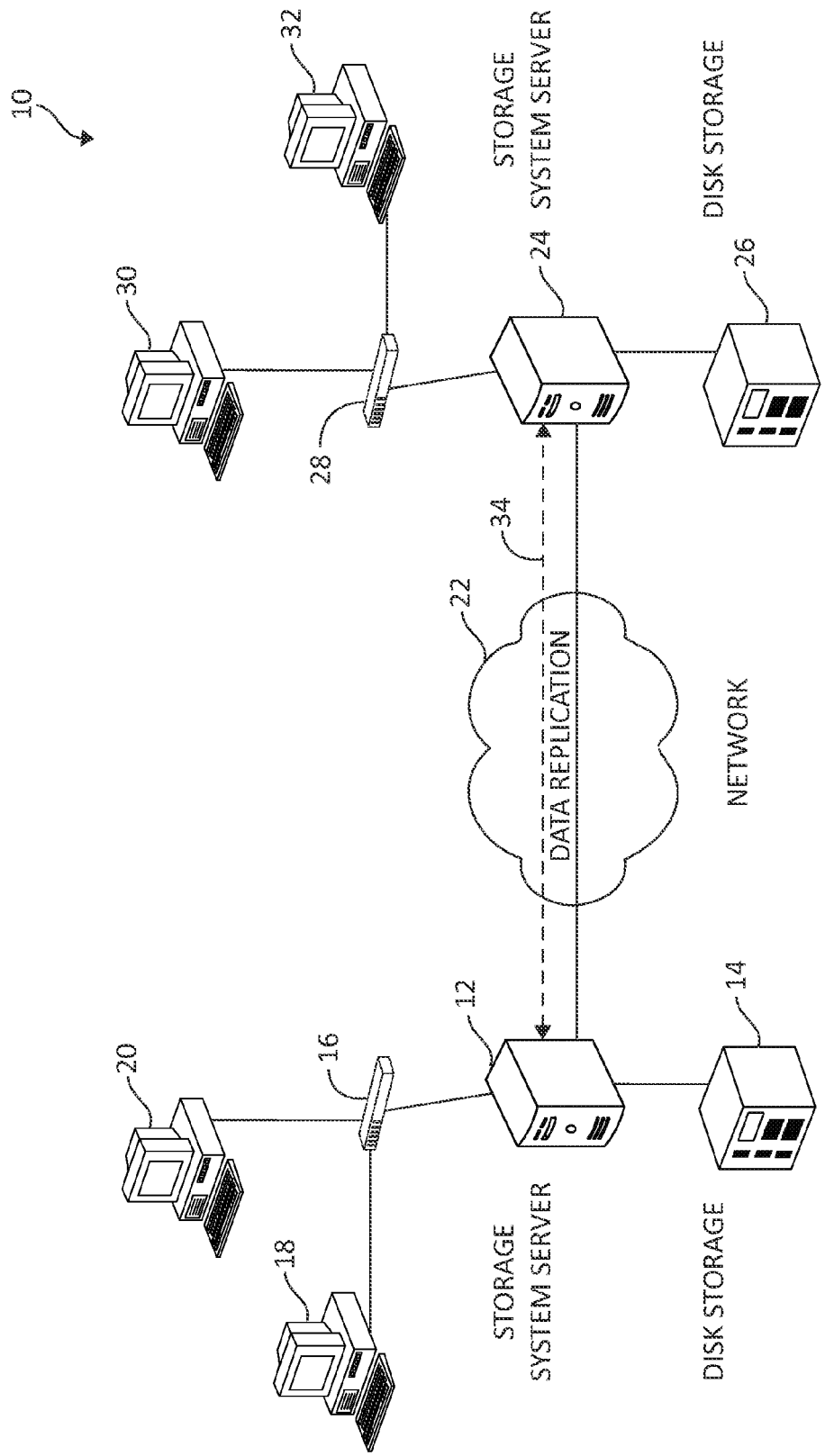
FIG. 1 illustrates an exemplary computing environment in which aspects of the present invention may be implemented.

Turning now to FIG. 1, an exemplary architecture 10 of a computing environment in which various aspects of the present invention and following claimed subject matter is depicted. In the depicted embodiment, architecture 10 is implemented for deduplicated data replication across a network 20 as shown. While architecture 10 is depicted as an exemplary computing environment, on of ordinary skill in the art will appreciate that a variety of computing environments may implement various aspects of the present invention. In fact, any computing environment containing some form of a scheduling system or performing some scheduling functionality may implement at least one or more aspects of the present invention.

Returning to the depicted embodiment, architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18. A network 20 connects such deduplication systems 30 and routers 32. Network 20 may, in one embodiment, include a wide area network (WAN). In other embodiments, network 20 may include local area networks (LANs), storage area networks (SANs), and other network topologies known to the one of ordinary skill in the art. While routers 32 and switches 28 are shown, the one of ordinary skill in the art will also appreciate that additional and/or substitute networking components are contemplated.

In one embodiment, switch 28 is compliant with a fiber channel network protocol, making the switch 28 and interconnected components capable of executing commands such as small computer systems interface (SCSI) commands. Such commands may be executed for a variety of storage devices, again as the one of ordinary skill in the art will appreciate, such as disk drives, tape devices, solid state devices (SSDs), and the like.

Figure 2:
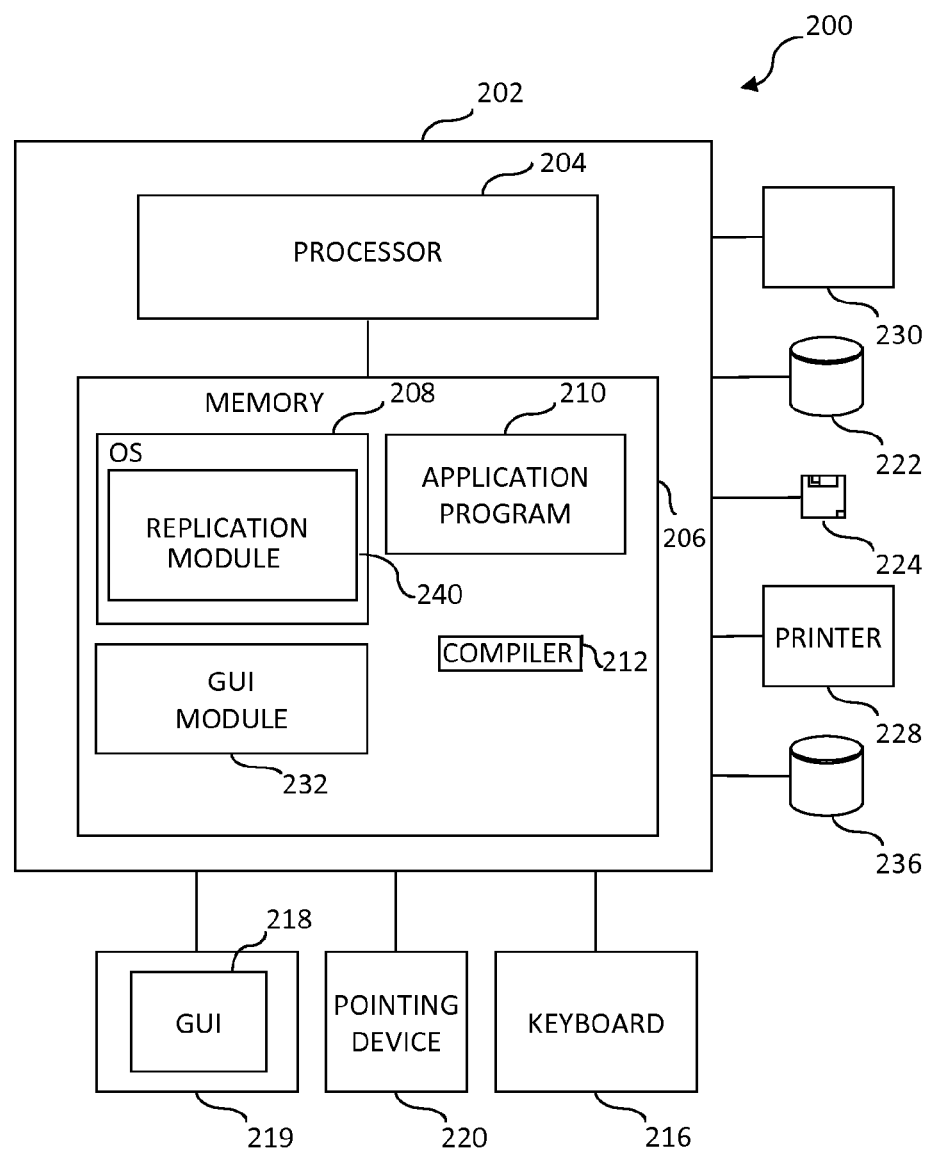
FIG. 2 illustrates an exemplary portion of a replication system as illustrated in FIG. 1, previously, including a processor device.

FIG. 2 hereafter provides an example of a portion of the computer architecture 10 depicted in FIG. 1 in which the mechanisms of the foregoing embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

FIG. 2 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 which may be adapted for carrying out various processes and mechanisms in the exemplary embodiments previously described. Replication module 240 may be implemented in hardware, firmware, or a combination of hardware and firmware. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 2, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Figure 3:
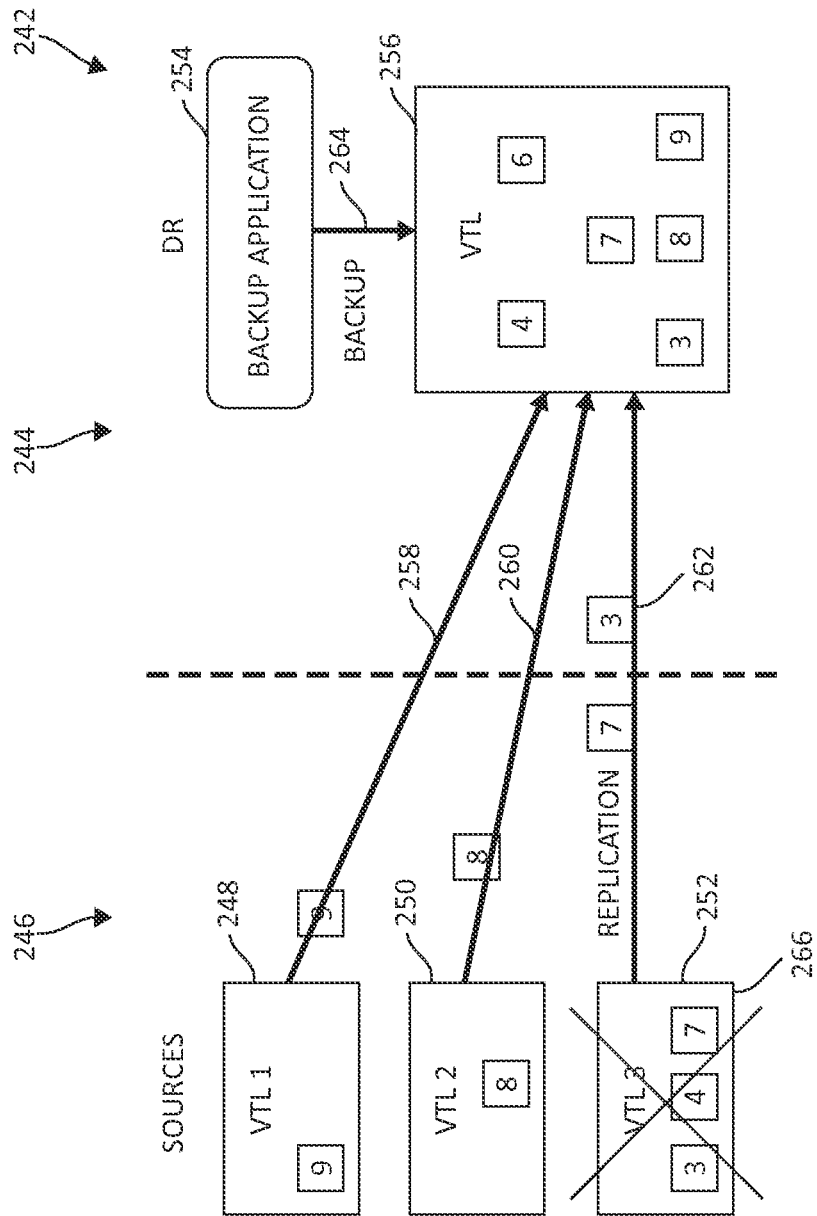
FIG. 3 illustrates exemplary replication between three data storage facilities and a single DR system, here embodied as virtual tape libraries (VTLs)

As mentioned previously, current DR replication mechanisms fail to address various scenarios where, following a prolonged failure of a first data storage system, synchronization between the first and a second data storage system is needed to ensure data integrity, for example. Turning to FIG. 3, exemplary replication 242 is shown between three source data storage facilities 248, 250, and 252 and a single disaster recovery (DR) system 244. As illustrated, the exemplary replication 242 is split between a number of source systems (collectively indicated by arrow 246) and the DR system 244.

DR system 244 includes a backup application 254 capable of operating in a DR mode, writing backup data 264 to a storage facility (here embodied as a virtual tape library, or VTL) 256. Source storage facilities 248, 250, and 252 are also embodied as VTL systems as depicted. In the illustrated scenario, a many-to-one replication (denoted by reference numbers 258, 260, and 262) operation of various objects (e.g., 9, 8, 7, and 3) is depicted, and in during this replication operation source system 252 suffers a prolonged failure (as depicted by the X 266). As a result of this failure, object 3 has passed fully, object 7 failed after replicating some data, and object 4 was not replicated at all. The DR system 244, now working as production, has now created objects 6 and 4. In an exemplary VTL embodiment, such objects may be cartridges, or other storage objects as one of ordinary skill in the art will appreciate.

The following illustrated embodiments provide mechanisms for, at least temporarily, pausing replication to a system (such as a remote site as presently depicted) declared as being in a DR mode (such as a test procedure) to perform synchronization operations as will be further described. Pursuant to one of these synchronization operations, "ownership" of storage objects may be transferred between systems, again as will be described, below. In one embodiment, the declaration of entering a DR mode is performed by a remote system administrator in his own system, for example. In one of the illustrated embodiments, the DR mode status is received and heuristically attempted to distribute to fellow members of the applicable replication group. The illustrated embodiments provide for synchronizing ownership of replicate objects, during such a pause in the DR mode, at a storage facility while the facility is operating in a DR mode, and while the storage facility is still a replication target of other source storage facilities and a backup target for a local backup operation.

In order to exit the DR mode, in one embodiment, the user may choose to execute a "takeover" operation, as will be illustrated below, to synchronize its ownership over the source system storage objects. The mechanisms of the illustrated embodiments allow the DR system, for example, to define such a takeover operation, and pursuant to such an operation, execute synchronization processes on the storage objects (such as cartridges in a VTL embodiment). Such synchronization processes ensure ownership of storage objects is coordinated at the CR system and the applicable source storage facility or facilities. In this manner, the mechanisms of the present invention provide inherent synchronization functionality for storage systems (such as virtual tape systems), in order, for example, to restore a replication group state to an original state prior to a disaster, and hence, allow seamless production site switching to/from the applicable DR site. In addition, the mechanisms of the present invention work in parallel to normal replication in order to provide a DR capability to a single or a set of source storage facilities, while allowing the remainder of the storage systems to continue to replicate normally.

In one exemplary embodiment, a takeover operation may be performed as follows. First, the user makes a determination to allow a DR system to transfer ownership of its replicate objects from a specific source data storage facility to the DR system. The source system that was selected for such ownership transfer is examined to determine if this system had left the applicable replication grid prior to this takeover operation. As a next step, the DR system receives the ownership of the source data storage facility's storage objects (e.g., cartridges). The replacement announcement is then distributed among all the applicable systems in the replication grid.

The following terminology may be helpful in having a better understanding of the exemplary takeover operation described previously. First, "ownership" (such as cartridge ownership, for example) may be intended to refer to at least one attribute of a data object indicating the object's ability to be written at a certain system. For instance, a particular cartridge may only be write-enabled on a respective owner system. A "DR mode" of operation may be intended to refer to an indication at a remote system that a certain remote system is not used as a DR for certain storage systems. Pursuant to entry into the DR mode of operation, replication communication from an applicable source system may be blocked in order to protect replicated data.

Continuing the previously begun terminology further, a "replacement process" may be intended to refer to a process authorizing a DR system to transfer ownership while temporarily withdrawn from, or "stepped out" from the DR mode of operation. "Replication" may be intended to refer to a process of incrementally copying data (such as deduplicated data) between systems residing in a same replication grid. Finally, a "replication grid" may refer to a logical group providing context in which the replication operation may be established between different physically connected members.

In one embodiment, an exemplary takeover operation may continue to proceed as follows. In such a scenario, a DR mode of operation is activated at the DR system for a specific source system. To this regard, the DR mode is entered in order to protect replica objects, and in order to allow the takeover operation to proceed. As a following step, a determination is made to execute the takeover operation. In one embodiment, such a determination is made by a user. In other embodiments, this determination may be made using a variety of factors as one of ordinary skill in the art will appreciate.

Once the takeover operation commences, a further determination is made as to whether the takeover may be executed for a specifically chosen source system, and whether the applicable DR system had replaced the specific source system using a particular replacement procedure. If these system checks are validly passed, the system then moves to change ownership of all replica objects from the specific source system to the applicable DR system.

Once the ownership of all replica objects is changed, the applicable source system's production site is created/continued at the DR site only. At a subsequent time, the DR mode of operation is exited for the specific source system.

Figure 4:
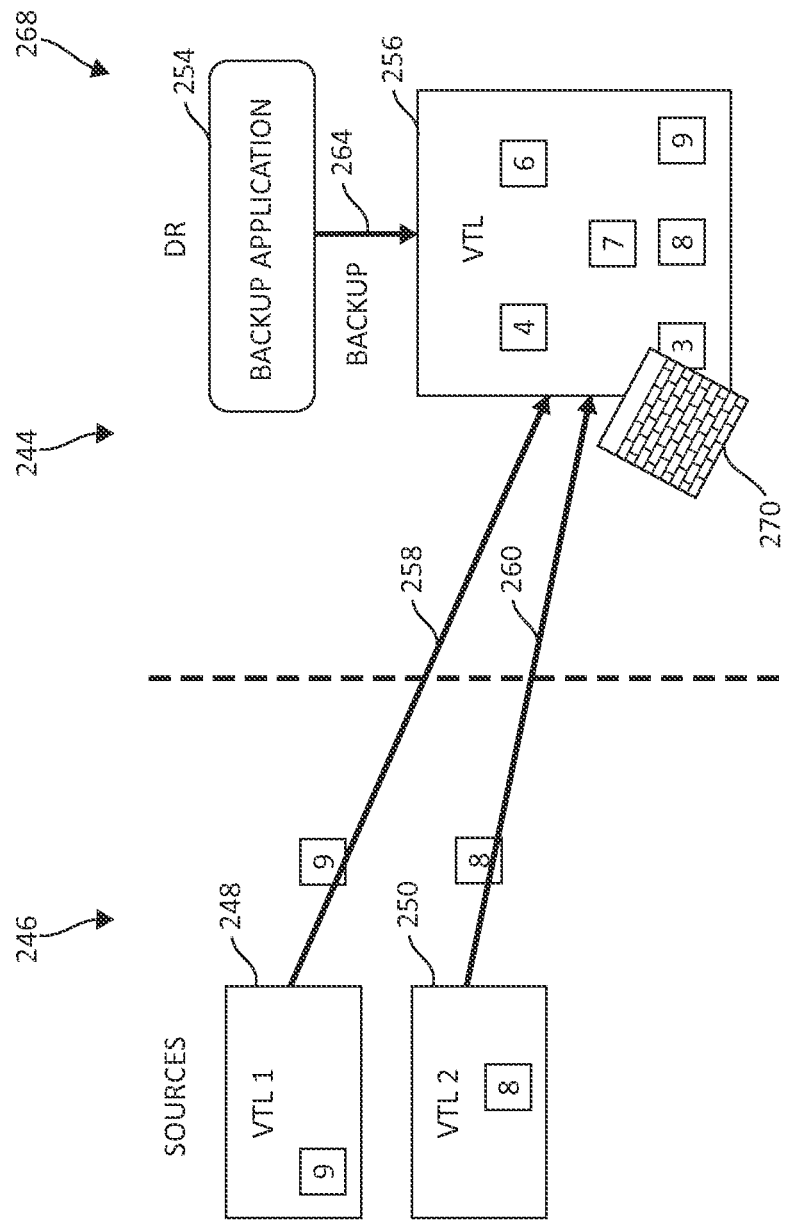
FIG. 4 illustrates a state of operation of two remaining source data storage facilities before execution of a takeover operation.

Turning now to FIG. 4, a scenario 268 is depicted illustrating DR system 244 and the remaining source systems 246 before the takeover operation is executed. The source system 252 has ceased operation, and is removed from view. The remote system is in DR mode with regard to source system 252, and therefore cannot receive replication from the source system 252. Firewall 270 illustrates the inhibition of replication in this regard. The other source systems continue to replicate (as denoted by reference numbers 258 and 260) objects 9 and 8 normally, and the DR system 244 keeps backing up 264 local data. This is a temporary DR state for source system 252. If the DR mode is canceled without performing a takeover operation, ownership synchronization of the associated storage objects of source system 252 may be lost when production is moved.

Figure 5:
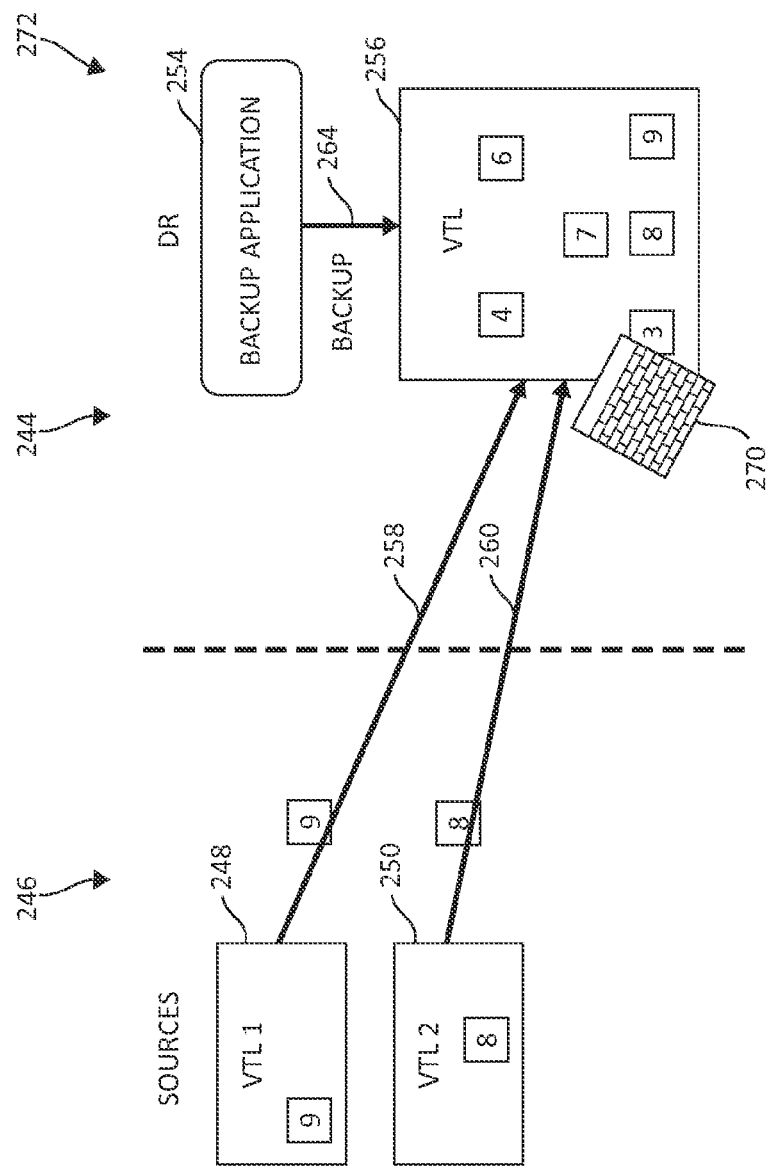
FIG. 5 illustrates execution of an exemplary takeover operation, in which various aspects of the present invention and following claimed subject matter may be illustrated.

Turning now to FIG. 5, exemplary execution of a takeover operation 272 by a DR system 244 is shown. Here again, source system 252 is eliminated from view and operation, while source systems 248 and 250 continue to operate normally. Here, as shown, the DR system 244 has executed a replacement process, and pursuant to such process, has stipulated that the DR system is replacing the source system 252. Objects 3 and 7 will change ownership to the DR system 244 after the determination is made that the DR system actually replaced the former source system 252.

Figure 6:
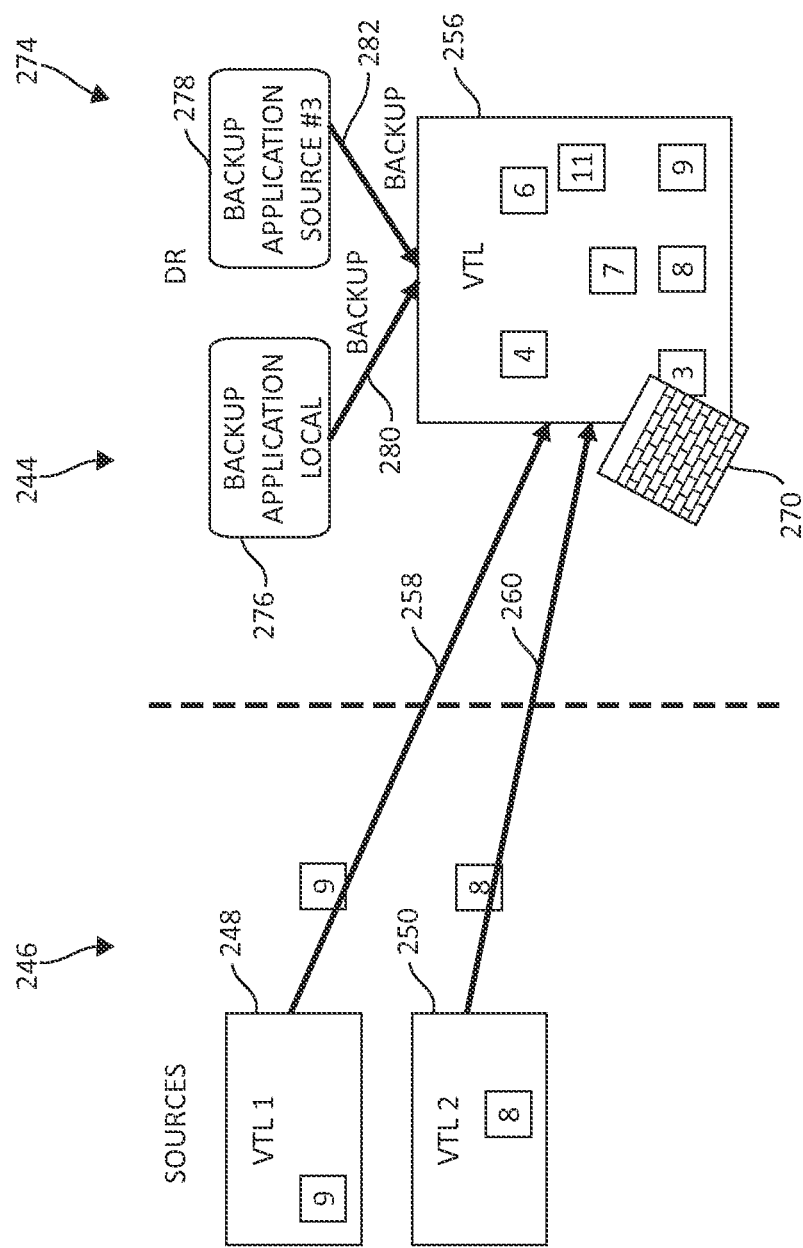
FIG. 6 illustrates transfer of ownership of the third source data storage facility to the DR system, in which various aspects of the present invention and following claimed subject matter may be illustrated.

Turning now to FIG. 6, following, source systems 246 and DR system 244 is again shown, as is normal replication 258 and 260 of objects 9 and 8, respectively to the VTL system 256. As depicted, scenario 274 illustrates moving the production site of source storage system 252 to the DR site 244 (here shown by reference number 278). Object 11 is a new object (again, such as a cartridge) written by the new production backup application 278 using backup I/O 282 to VTL 256 as shown. Local backup operations 276 to VTL 256 also continue by virtue of backup I/O 280 as shown. The object 11 automatically receives ownership of the DR system 244. Replication between VTL 256 and the source system 252 continues to be blocked by virtue of firewall 270 as shown.

Figure 7:
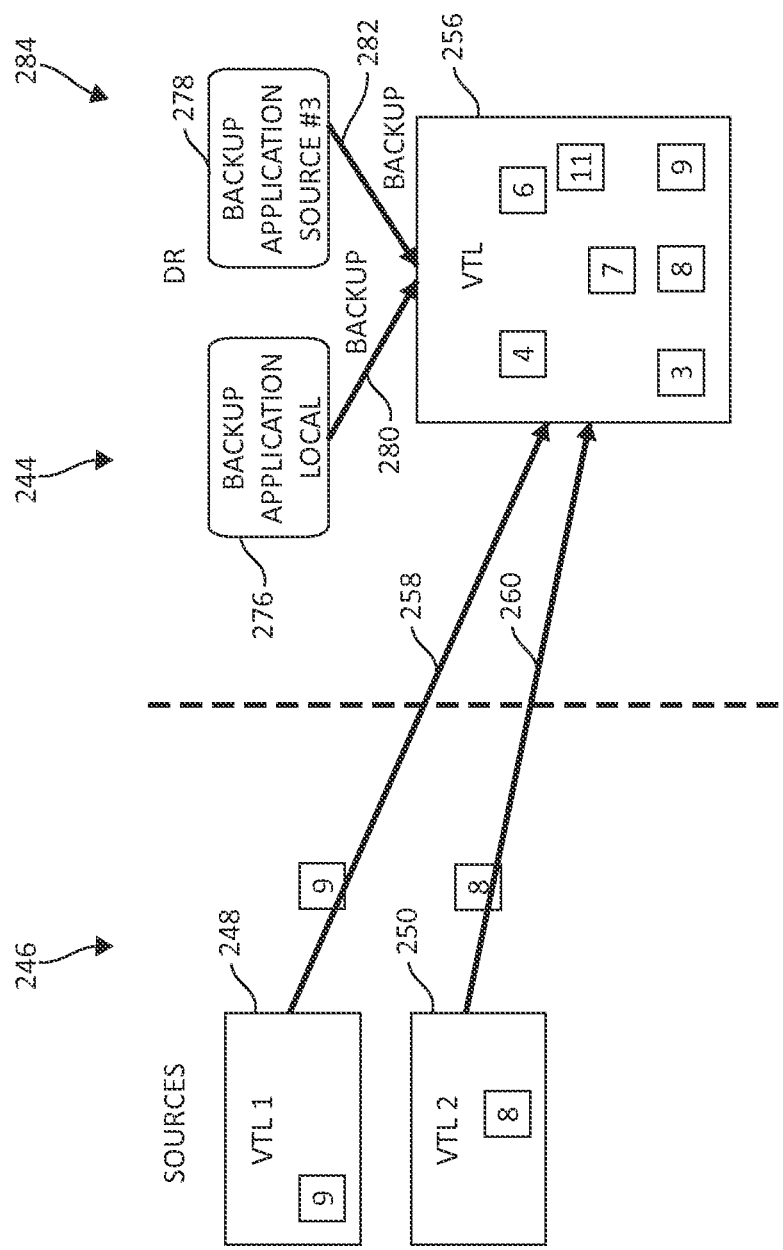
FIG. 7 illustrates an exit of a DR mode of operation and a return to normal operation, in which various aspects of the present invention and following claimed subject matter may be illustrated.

Turning now to FIG. 7, the production site of source storage system 252 is shown as permanently moved to the DR site 244 following completion of the takeover operation first depicted in FIG. 6, previously. Here again, normal replication of objects 9 and 8 occurs between source systems 248 and 250 (designated by replication 258 and 260). Normal operation is obtained for source system 252 production data via the DR site 244 by implementation of backup application 278 implementing backup I/O 252 to VTL 256. The DR system 244, once this state is reached, is then free to exit the DR mode of operation, and normal operation for each source system 248, 250, and 252 continues as before.

Figure 8:
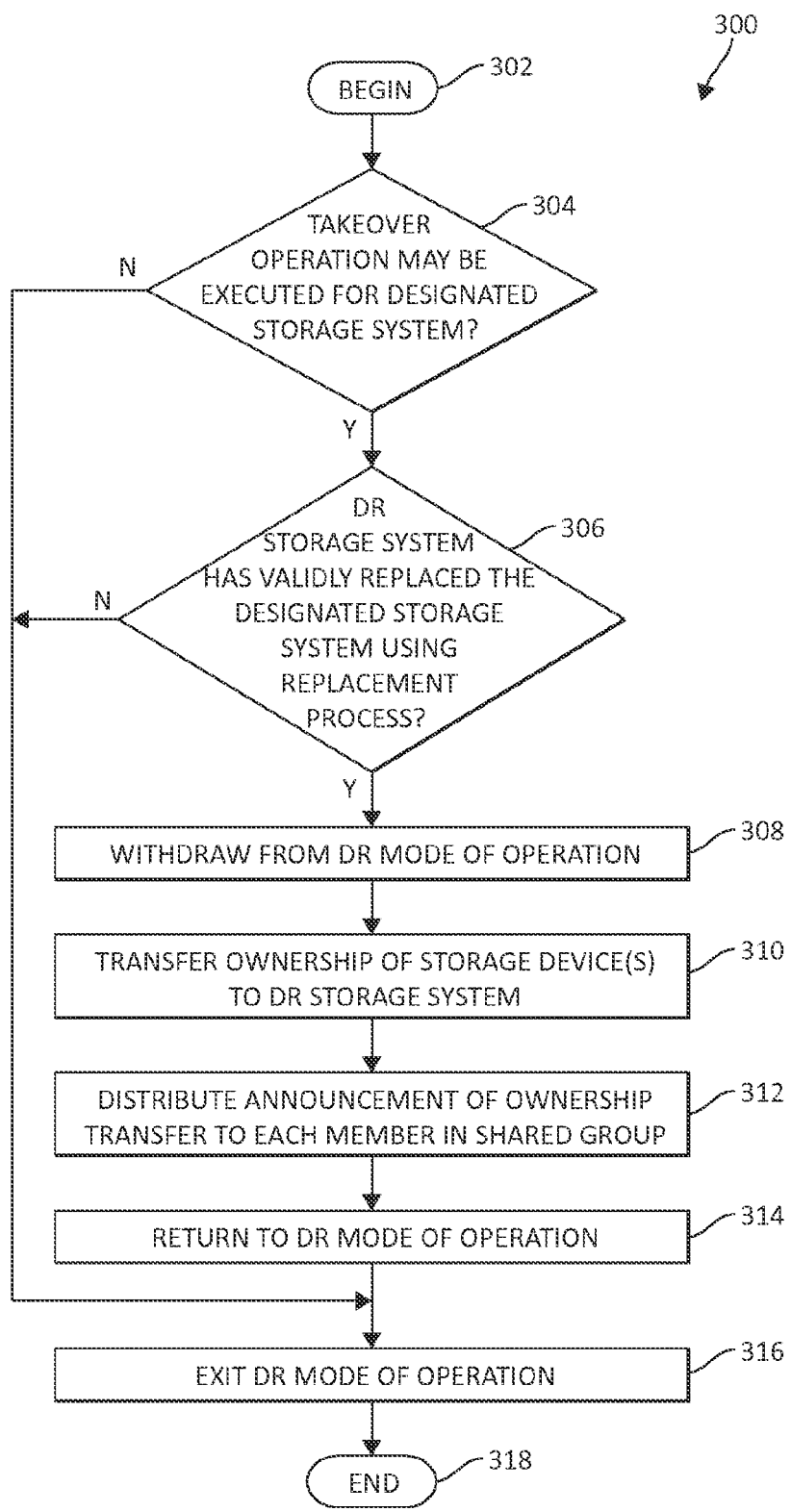
FIG. 8 illustrates an exemplary method for disaster recovery (DR) production takeover in a deduplication system, again in which various aspects of the present invention may be implemented.

Turning now to FIG. 8, a flow chart diagram of an exemplary method 300 for disaster recovery (DR) takeover in a computing environment by a processor device is shown. Method 300 begins (step 302) with a determination of whether the applicable takeover operation may be executed for a designated storage system (step 304). If yes, an additional determination is made as to whether the DR storage system has validly replaced the designated storage system using a replacement process (step 306). If either of these checks is not validly returned, the method 300 ends (step 318) without executing the takeover operation.

Assuming, however, that such checks were validly returned, method 300 continues with step 308, which causes the DR system to temporarily withdraw from the DR mode of operation to commence the takeover operation. As a following step, ownership of applicable storage devices (e.g., objects, cartridges, and the like) are transferred to the DR storage system (step 310). An announcement of the ownership transfer is shared to each member in an applicable shared group (step 312). This may be certain members in a replication grid depending on various factors, or it may include each member in the replication grid.

Following the distribution of the announcement of ownership transfer, the DR system returns to the DR mode of operation (step 314), until the DR mode of operation is no longer necessary to be continued. Once this is the case, the DR mode of operation is exited (step 316), and the method 300 then ends (step 318).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the one of ordinary skill in the art will appreciate that modifications and adaptations to those embodiments may be made without departing from the scope of the present invention as set forth in the following claims.

The invention claimed is:

1. A method of disaster recovery (DR) production takeover in a computing environment comprising a primary storage system including a processor and a plurality of storage devices and further comprising a DR storage system including a replicated version of the plurality of storage devices remotely located from the primary storage system, the method comprising:
determining, by the processor, that a storage device in the plurality of storage devices is experiencing a failure;
transferring ownership of the storage device from the primary storage system to the DR storage system in response to the determination;
locally replicating the storage device subsequent to transferring ownership of the storage device such that the DR storage system includes both a first replicated version of the storage device and a second replicated version of the storage device; and
distributing an announcement of the ownership transfer to a member in a shared group operable in the computing environment subsequent to transferring ownership of the storage device.

2. The method of claim 1, wherein the shared group forms at least a portion of a replication grid.

3. The method of claim 1, wherein the storage device is a cartridge in a virtual tape library (VTL), and transferring the ownership includes transferring an attribute of the cartridge indicating an ability of the cartridge to be written at a predetermined storage system operable in the computing environment.

4. The method of claim 1, further comprising retaining ownership of at least one remaining storage device in the plurality of storage devices by the primary storage system.

5. The method of claim 1, further comprising moving a production site of the storage device from the primary storage system to the DR storage system in response to transferring ownership.

6. A system for disaster recovery (DR) production takeover in a computing environment including a plurality of storage devices, comprising:
a processor, operable in the computing environment, wherein the processor device is configured for:
determining, by the processor, that a storage device in the plurality of storage devices is experiencing a failure,
transferring ownership of the storage device from the primary storage system to the DR storage system in response to the determination,
locally replicating the storage device subsequent to transferring ownership of the storage device such that the DR storage system includes both a first replicated version of the storage device and a second replicated version of the storage device, and
distributing an announcement of the ownership transfer to a member in a shared group operable in the computing environment subsequent to transferring ownership of the storage device.

7. The system of claim 6, wherein the shared group is at least a portion of a replication grid.

8. The system of claim 6, wherein the storage device is a cartridge in a virtual tape library (VTL).

9. The system of claim 8, wherein the processor is further configured for, subsequent to transferring the ownership, transferring an attribute of the cartridge indicating an ability of the cartridge to be written at a predetermined storage system operable in the computing environment.

10. The system of claim 6, wherein the processor is a storage management processor (SMP) device.

11. The system of claim 6, wherein the processor is further configured for retaining ownership of at least one remaining storage device in the plurality of storage devices by the primary storage system.

12. The system of claim 6, wherein the processor is further configured for moving a production site of the storage device from the primary storage system to the DR storage system in response to transferring ownership.

13. A computer program product for disaster recovery (DR) production takeover in a computing environment comprising a primary storage system including a processor and a plurality of storage devices and further comprising a DR storage system including a replicated version of the plurality of storage devices remotely located from the primary storage system, the computer program product comprising a computer-readable memory including computer-readable program code portions stored therein, the computer-readable program code portions comprising:
  computer code for determining, by the processor, that a storage device in the plurality of storage devices is experiencing a failure;
  computer code for transferring ownership of the storage device from the primary storage system to the DR storage system in response to the determination;
  computer code for locally replicating the storage device subsequent to transferring ownership of the storage device such that the DR storage system includes both a first replicated version of the storage device and a second replicated version of the storage device; and
  computer code for distributing an announcement of the ownership transfer to a member in a shared group operable in the computing environment subsequent to transferring ownership of the storage device.

14. The computer program product of claim 13, wherein the shared group forms at least a portion of a replication grid.

15. The computer program product of claim 13, wherein the storage device is a cartridge in a virtual tape library (VTL), and transferring the ownership includes transferring an attribute of the cartridge indicating an ability of the cartridge to be written at a predetermined storage system operable in the computing environment.

16. The computer program product of claim 13, further comprising computer code for retaining ownership of at least one remaining storage device in the plurality of storage devices by the primary storage system.

17. The computer program product of claim 13, further comprising computer code for moving a production site of the storage device from the primary storage system to the DR storage system in response to transferring ownership.

* * * * *